Aug. 13, 1968  E. L. GALLE  3,397,067
FLOUR PRODUCT AND METHOD OF MAKING
Filed Jan. 20, 1967  4 Sheets-Sheet 1

INVENTOR.
EDWARD L. GALLE
BY
James V. Harnish
ATTORNEY

FIG 8

Aug. 13, 1968 E. L. GALLE 3,397,067
FLOUR PRODUCT AND METHOD OF MAKING
Filed Jan. 20, 1967 4 Sheets-Sheet 4

INVENTOR.
EDWARD L. GALLE
BY
James V. Harrison
ATTORNEY

United States Patent Office 3,397,067
Patented Aug. 13, 1968

3,397,067
FLOUR PRODUCT AND METHOD OF MAKING
Edward L. Galle, St. Paul, Minn., assignor to The Pillsbury Company, Minneapolis, Minn., a corporation of Delaware
Continuation-in-part of application Ser. No. 382,283, July 13, 1964. This application Jan. 20, 1967, Ser. No. 610,554
10 Claims. (Cl. 99—93)

ABSTRACT OF THE DISCLOSURE

Agglomerating high protein fine cereal flour by increasing the moisture content, briefly mixing and agitating the moistened flour in a first zone, immediately transferring the flour to at least one other mixing zone, continuing the mixing and agitation until sufficient bonding has occurred, then drying the agglomerates.

---

This is a continuation-in-part application of my prior application United States Serial No. 382,283, filed on July 13, 1964, now abandoned.

This invention relates to novel methods and apparatus for agglomerating cereal flour particles to improve the physical characteristics thereof and the resulting novel agglomerated product, and more particularly to the agglomeration of a high protein fine particles size flour fraction which is particularly well suited for blending purposes to make premium bakery flour.

Flour in general and the aforementioned high protein fine fraction flour in particular has always been exceedingly difficult to handle in conventional flour processing and handling systems. The fine fraction flour particles exhibit very poor flow characteristics, being even more difficult to handle than most conventional types of flour, and incapable of being sifted by conventional sifting means.

The high protein fine flour fraction under consideration is normally derived by the air separation or fractionation of milled cereal flours including soft and hard wheat, rye, barley, corn, durum and rice and consists of exceedingly fine particles most of which are less than 20 microns in size, the average size thereof normally being in the range of 3 to 5 microns. This fraction consists principally of protein and starch with a small percentage of fat present.

Because of the poor flow characteristics of high protein fine fraction flour, its difficulty in handling and its non-adaptability to conventional flour processing and handling systems, its use has been seriously limited and curtailed despite the fact that it has a number of very desirable uses and applications such as a bread flour additive or improver, this high protein fine fraction product imparting improved grain and texture to the bread product formed therefrom. The poor flowability of this fine fraction is due not only to the very fine particle size but also to the electrostatic charge carried by said particles.

The primary purpose of this invention is to provide an improved flour product and particularly an improved high protein fine fraction product, which overcomes the aforementioned problems and which more particularly is free-flowing, dust-free, and easily handled and capable of being used in conventional flour processing and handling systems so as to extend the use thereof.

Another object of this invention is to provide a method and apparatus for forming the aforementioned improved product.

Another object of the invention is to provide an improved method and apparatus for forming agglomerated high protein compositions characterized by producing uniform agglomerates at relatively high flow rates without the tendency for the apparatus to become plugged with undesired accumulations or deposits of moist material.

A further object of the invention is to provide an improved method and apparatus of the type described wherein agglomerates are subjected to mixing in two successive mixing zones including a first zone for providing uniform and thorough mixing and a second zone for mixing the previously moistened material for a relatively long period of time.

A further object of the invention is the provision of an improved agglomerating method and apparatus for pulverulent material having a high protein content wherein the moistened material is first subjected to turbulent and vigorous mixing and is then immediately suspended in a stream of heated drying gas.

Still another object is to provide an improved flour product and particularly an improved high protein fine fraction product which exhibits improved baking characteristics as compared with the same material in its conventional form. The following disclosure is directed particularly to high protein fine fraction flour and methods and apparatus for treating same. However, the invention is not necessarily limited thereto, the methods and apparatus disclosed hereinafter also being applicable to other forms of flour.

These and other objects and advantages of this invention will more fully appear from the following description made in connection with the accompanying drawings, wherein like reference characters refer to the same or similar parts throughout the several views, and in which.

For convenience, the high protein fine flour fraction under consideration is hereinafter referred to as HPFF. For purposes of the application, high protein fine fraction flour (HPFF) contains 18–23% protein and has a maximum Fisher particle size value of 5.0.

I have found that the aforementioned problems can be overcome and HPFF placed in an improved form capable of being readily handled in conventional material handling systems by assembling the fine particles thereof into porous agglomerates. These agglomerates consist of a plurality of fine particles of HPFF randomly clustered together and bonded at their interfaces by protein. These particles define a multiplicity of interstices and voids therebetween which provide the agglomerates with the aforementioned porous structure and provide a liquid access to the agglomerate interior so as to facilitate the wetting of he particles forming the agglomerate and the dispersion thereof in a liquid. HPFF in this agglomerated form is free-flowing, dust-free and easily handled in conventional flour processing and handling systems. The agglomerated HPFF has a higher bulk density than the non-agglomerated HPFF and therefore occupies less space, thereby simplifying and reducing the cost of storing and packaging same. This higher bulk density is somewhat surprising in view of the fact that most known agglomerated products have a lower bulk density than the starting material. The agglomerates also exhibit improved baking characteristics as compared with the non-agglomerated material.

The method or process of this invention for agglomerating HPFF can be carried out on a batch or continuous basis, the continuous process being more practical and commercially attractive. Preferred embodiments of the invention are illustrated in the accompanying drawings and description.

The process for agglomerating HPFF broadly comprises moisturizing the particles with sufficient moisture to form adhesive surfaces thereon combined with agitation of a mass of these moistened adhesive particles whereby they are brought into random contact with each other and thereby form the desired agglomerates.

In order to obtain the most desirable type of agglomerate and to achieve maximum efficiency in the agglomeration, the amount of moisture added to the material to be agglomerated is preferably carefully controlled so as to provide enough moisture to achieve the degree of adhesiveness on the particles sufficient to form a strong bond between the particles comprising the agglomerates, and also to prevent over-moisturization and the resultant excessive glutenization of the protein which is normally considered undesirable. Investigation and experimentation has indicated that agglomeration can be accomplished by increasing the moisture content of the material to a total moisture content of about 20–35% during agglomeration. When the total moisture is 22% or lower, the agglomerates are quite soft and fragile and therefore are generally considered unsuitable for bulk handling because of their tendency to break down handling. Total moisture contents of 35% and higher generally represent some excessive moisture not needed for successful agglomeration which may cause some excessive glutenization of the protein and put a greater (and normally unnecessary) load on the drying equipment used to remove the added moisture from the agglomerates after the formation thereof. The optimum moisture content for agglomeration is dependent on the form of the invention as will be illustrated below.

To assemble the moistened particles into the desired agglomerates, it is preferable to repeatedly agitate (as by shaking) a mass of material after the initial moisturization thereof for a period of time which is sufficient to enable the moisture added to the material to be absorbed by and react with the particles to form the degree of adhesiveness desired and required to effect the agglomeration. The moistened particles are also maintained in dense, intimate relationship with each other during this agitation whereby they make repeated random contact with each other so that when they develop the necessary degree of adhesiveness they stick together in clusters and form porous agglomerates.

In one preferred form of this invention, the material to be agglomerated is fed to a chamber where it is dispersed and has the desired amount of moisture added thereto while in the dispersed condition, the moistened material thereafter being discharged from said chamber and moved en masse in supported fashion along a predetermined path of travel while being simultaneously and continuously agitated with the desired agglomerates having been formed by the time the material reaches the end of said predetermined path of travel. Alternatively, the moisturized material may be permitted to remain in the moisturizing chamber with suitable agitation provided therefor in said chamber for the period of time necessary to complete the agglomeration, the addition of moisture to said chamber being stopped as soon as the predetermined amount necessary to achieve the agglomeration has been added, with the agitation continuing thereafter.

In another form of the invention, the flour is moistened and subjected to vigorous mixing in a highly turbulent state in two successive mixing zones, the first zone being characterized by providing extremely high turbulence and thorough mixing during a relatively brief treatment period and the second treatment zone being characterized by providing continued mixing of the premoistened material over a substantially longer period of time. The agglomerates produced in the second mixer are then immediately introduced to a rising stream of a heated drying gas.

After formation of the agglomerates, they are preferably dried, preferably immediately and preferably to a total moisture content of not more than 14%.

The temperature of the agglomerating system normally should be controlled and maintained at a sufficiently low temperature so that no undesirable changes occur in the physical and chemical make-up of the material, such as gelatinization of the starch or degradation of the protein.

In a continuous process, it is also important that the HPFF in the feed-in system which delivers the material to the agglomerator be kept continuously moving in said feed-in system during the agglomeration operation. If the feed is interrupted and the movement of the material in the feed-in system momentarily stops, the poor flow characteristics of the unagglomerated material make it difficult to get the unagglomerated material moving again in the feed-in system.

After the agglomerates have been formed and dried, they may be used either in said dried form or may be reduced in size if desired such as by grinding, the ground agglomerates retaining their agglomerated form and free-flowing characteristics, the reduction in size as by grinding reducing only the size of the agglomerates and not the character thereof.

Figures 1, 4, 7:
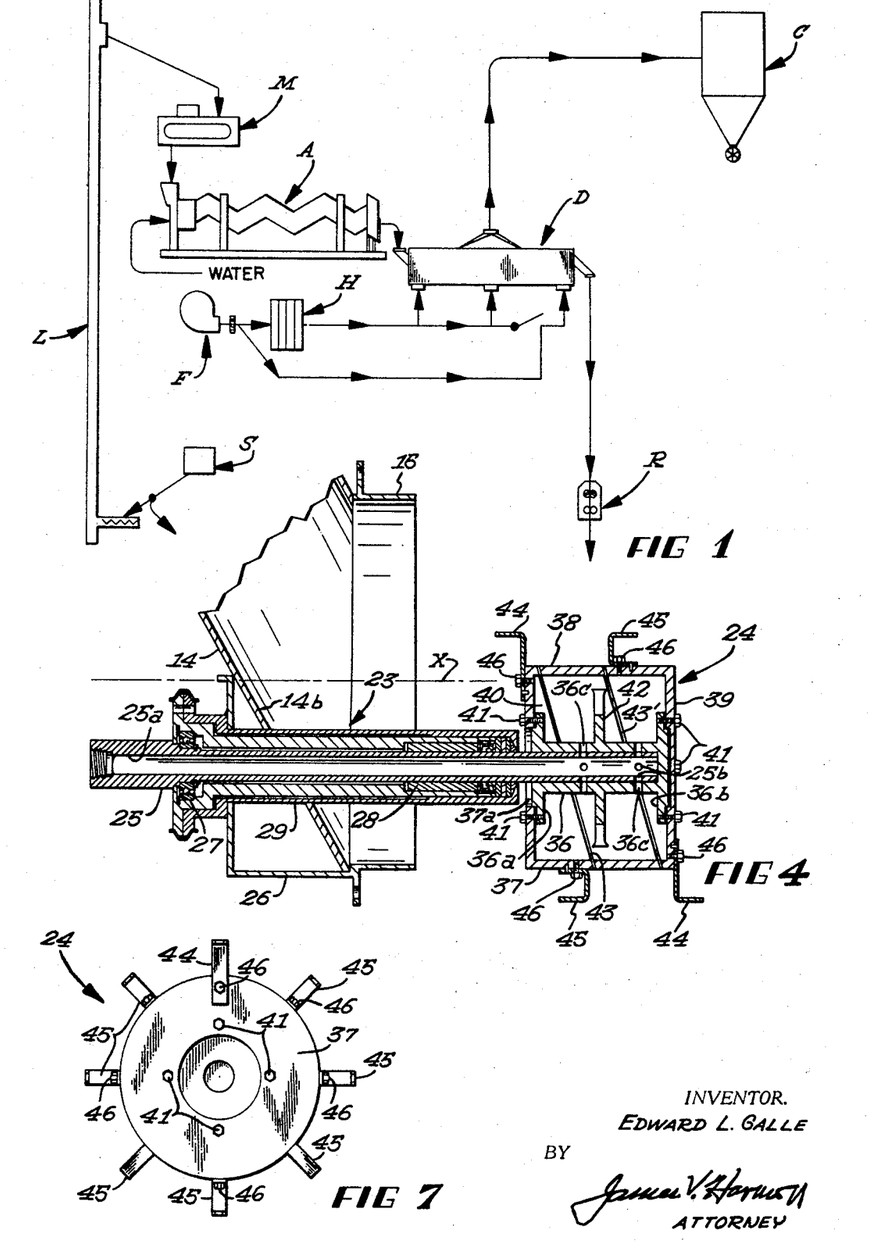
FIGURE 1 is a flow diagram of a continuous process for carrying out this invention.
FIGURE 4 is an enlarged detail view of the liquid feed assembly used in the agglomerator of FIGURE 2.
FIGURE 7 is an end elevational view of the right end of the apparatus as seen in FIGURE 4.

FIGURE 1 is a flow diagram of one complete preferred continuous agglomeration process for carrying out the agglomeration of HPFF and other flour material. As can be seen in said flow diagram, the unagglomerated pulverant material is first passed through a sifter S, from wence the sifted material is continuously conveyed and elevated by a lift L to a metering mechanism M which continuously discharges the material to be agglomerated at a predetermined uniform rate to the input side of an agglomerator A. The material passes through the agglomerator A and is discharged therefrom in the form of porous agglomerates, the agglomerated material passing directly from the agglomerator to a dryer D. The dryer may be of any suitable type, one preferred type being one utilizing a vibrating screen in which the wet agglomerates pass across the screen and are agitated in the course of said travel by the vibration of said screen, the agglomerates being dried as they pass thereover by means of warm air entering through the bottom of the dryer and passed upwardly through the screen and the agglomerates thereon, the air being removed continuously from the top of the dryer and sent to a separator C where any entrained material is extracted therefrom. The drying air is supplied by a fan F which propels the air through a heater H and thence onto the dryer. The dried agglomerated product issuing from the dryer may be used as such, or it may be sent to size reduction mechanism such as the conventional two-high roll mill R illustrated for reducing the size of the agglomerates. The auxiliary equipment (other than the agglomerator A) such as the aforementioned sifter S, lift L, meter M, dryer D, roll mill R, fan F and heater H may be of any suitable design and construction capable of carrying out their intended purpose, and do not constitute a part of this invention per se, and a detailed description thereof is not believed necessary for a full and complete understanding of this invention.

Figures 2, 3, 5, 6:
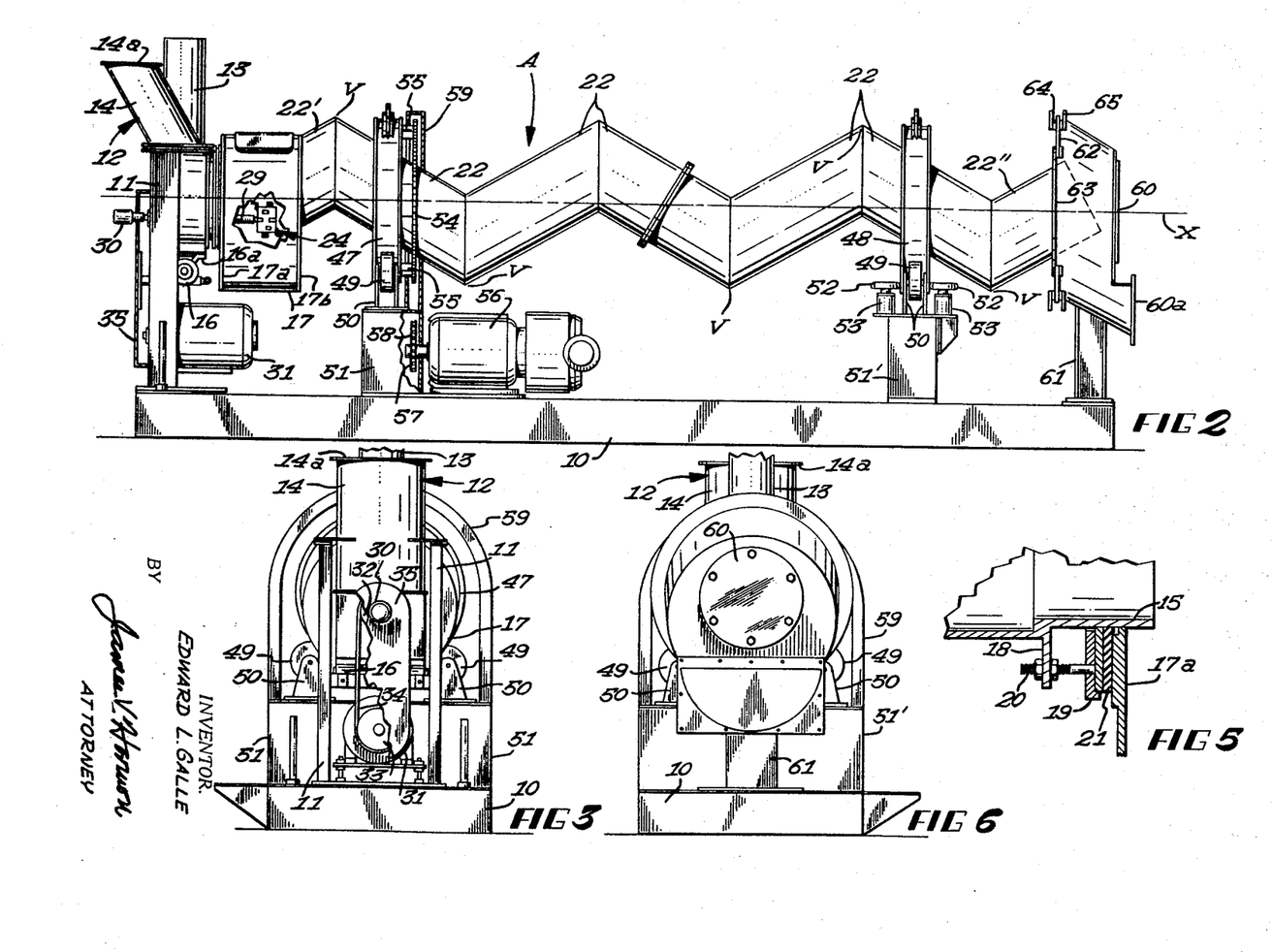
FIGURE 2 is a side elevational view (with portions broken away) of the agglomerator of FIGURE 1.
FIGURE 3 is an end elevational view of the agglomerator of FIGURE 2 as viewed from the left side thereof.
FIGURE 5 is an enlarged detail sectional view of the seal between the moisturizing cylinder and the feed hopper.
FIGURE 6 is an end elevational view of the agglomerator of FIGURE 2 as viewed from the right side thereof.

The illustrated agglomerator A, which is one preferred apparatus for carrying out the method and forming the agglomerated product of this invention includes a main supporting base 10 having a pair of upstanding transversely spaced apart supporting members 11 mounted thereon adjacent the input end of the agglomerator. These members 11 support a feed hopper 12 mounted thereon, which hopper includes a vertical feed tube 13, through which the material enters the agglomerator, an elliptical angularly oriented access hopper tube 14 having a cover 14a hinged thereto, and a generally horizontally oriented cylindrical discharge mouth 15 in communication with said tubes. An air operated vibrator 16 is provided for vibrating the feed hopper to prevent plugging thereof and insure a constant flow of material therethrough, said vibrator being suspended from and supported by said feed hopper by means of a mounting bracket assembly 16a.

An eccentrically rotatable cylindrical moisturizing chamber 17 is provided which is rotatably journaled on the cylindrical discharge mouth 15 of the feed hopper for rotation relative thereto about axis X, said moisturing chamber being eccentrically mounted with respect to axis X for a purpose hereinafter to be described. The side wall 17a of the moisturing cylinder 17 adjacent the feed hopper has a circular opening formed therein for receiving material from the hopper, said opening telescopically receiving the discharge mouth 15 of the hopper and being concentric therewith and with the rotation axis X, material entering the moisturizing chamber from the hopper by gravity flow.

To seal the joint between the hopper and the moisturizing cylinder, a seal assembly (best seen in FIGURE 5) is provided. This assembly includes an annular mounting flange 18 carried by the hopper, which flange supports an annular cup-shaped seal retainer 19 by means of a longitudinally adjustable mounting bolt 20. An annular resilient sealing ring 21 is provided which is held against the outer face of the side wall 17a in sealing engagement therewith by means of the retainer 19.

An agglomerating section is provided for conveying the wetted particles along a predetermined path of travel and agitating and bringing the wetted particles into repeated random contact with each other during said travel to form the desired agglomerates.

The agglomerating section comprises a series of cylindrical tubular sections or legs 22', 22 and 22'' (seven are illustrated) of the same cross sectional size which are joined together in end-to-end relationship in flow communication with each other, with adjacent legs being angularly offset from each other as illustrated to provide a zig-zag arrangement, with alternate legs being in parallel relationship to each other. Thus, the first, third and fifth and seventh legs of the series are parallel to each other, as are the second, fourth and sixth. The entire section is rotatable about the rotation axis X, with each leg having the same relationship to said rotation axis, with the longitudinal axis of each leg being in diagonal intersecting relationship to said rotation axis.

The first leg 22' of the series is joined to the side wall 17b of the moisturizing cylinder for simultaneous rotation of said cylinder and agglomerating section, a discharge opening being provided in said side wall 17b in communication with the first leg 22' for discharging wet particles from cylinder 17 into leg 22', the discharge and inlet openings in the moisturizing cylinder being in generally opposed relationship.

Because of the eccentric mounting of the moisturizing cylinder 17, it raises and lowers its charge once each revolution. When it is raising the charge, the adjacent first leg 22' of the zig-zag section is descending and material flows from that leg from the moisturizing chamber until said leg is filled. When the moisturizing cylinder is swinging downwardly so as to lower its charge, some but not all of the material in the first leg falls back again into the moisturizing chamber.

To moisturize the material in moisturizing cylinder 17, a novel liquid feed assembly indicated in the entirety by 23 and best seen in FIGURES 4 and 7 is provided. Said assembly includes a dispersion head 24 which is mounted on the inner end of a hollow drive shaft 25 and rotatably driven thereby inside the cylinder 17. The drive shaft 25 extends through and is supported by a bracket 26 forming a part of the hopper structure 12, and also extends through the back wall 14b of the access tube 14 into the cylinder 17.

The drive shaft is enclosed by and rotatably journaled on bearings 27 and 28 within an annular housing 29 which is secured to bracket 26 by any suitable means, such as welding.

The bore 25a of the drive shaft serves as the means for conveying liquid to the dispersion head, the liquid being supplied to the bore of the drive shaft through a rotating union 30 connected with the outer end of the drive shaft.

The drive shaft is driven by a motor 31 mounted on the base 10, said shaft and motor being drivingly interconnected by means of pulleys 32 and 33 drivingly connected to said shaft and motor respectively, and an endless drive belt 34 trained about said pulleys and enclosed by a protective belt guard 35.

The dispersion head 24 comprises a sleeve 36 telescopically mounted on the inner end of shaft 25, said sleeve having mounting flanges 36a and 36b formed on opposite ends thereof, and openings 36c formed therein aligned with similar openings 25b in the drive shaft for admitting liquid into the interior of the dispersion head from the bore of the drive shaft. Three oblique cylindrical sections 37, 38 and 39 are mounted on sleeve 36 to form a hollow drum which defines an annular chamber 40 from which the liquid is dispensed to the material to be agglomerated. The end wall of the inner end section 37 has an axial opening 37a for receiving the drive shaft. End sections 37 and 39 are secured to their respective flanges 36a and 36b by fasteners 41, and center section 38 is fastened to sleeve 36 by four radial braces 42 extending therebetween and connected thereto. The center section has a pair of parallel oblique rims which are opposed by and slightly spaced (a few thousandths of an inch) from the complementary oblique rims of the end sections 37 and 39, the opposed spaced apart oblique rims defining annular obliquely oriented orifices 43 and 43' which become whirling orifices when the dispersion head is rotated.

A metered flow of agglomerating liquid passes through bore 25a of the drive shaft, enters the annular chamber 40 through the aligned openings 25b and 36c, is subjected to centrifugal pull through the whirling orifices and is broken up and subdivided thereby and is thrown radially outwardly therefrom as a fog of very small finely atomized liquid particles against the material lining the inner wall of the cylinder 17. The orifices 43–43' are disposed at an angle so that the fog emerges as a wide band rather than in a narrow pattern or stream. This achieves more uniform distribution of the liquid and wetting of the fine pulverulent particles to be agglomerated.

To aid in dispersing the particulate material in cylinder 17, the dispersion head is provided with a plurality of L-shaped dispersion blades 44 and C-shaped dispersion blades 45 which are mounted on their respective head sections by fasteners 46 so as to extend radially therefrom. These blades are uniformly spaced about the entire circumference of the head and uniformly spaced axially thereof.

As the particulate material is fed into cylinder 17, it is dispersed by the whirling action of the dispersion head 24 and its blades and thrown outwardly against the wall of cylinder 17 to form a continuous layer of material thereon. The material is preferably fed to the cylinder 17 at such a rate that the cylinder wall is completely lined with material during rotation thereof to prevent the liquid from directly wetting said wall and achieve more uniform wetting of the particulate material.

The zig zag portion of the agglomerator is provided with means for supporting and rotating same. Said means includes a circular drive tire 47 and circular idling tire 48, said tires encircling the zig zag portions and drivingly connected to the tubes 22 enclosed thereby, said tires being coaxial with respect to axis X.

Each of said tires is supported for rotation on a pair of rollers 49, which rollers are supported by upstanding bifurcated brackets 50 which in turn are mounted on respective supporting blocks 51 and 51' which rest atop the base 10.

Guide wheels 52 rotatable about a vertical axis are provided on opposite sides of the idling tire in engagement therewith to prevent axial shifting movement of the idling tire and zig zag section during use. The guide wheels are supported by brackets 53 mounted on block 51'.

To rotate the agglomerator about axis X, an annular drive sprocket 54 is provided which circumscribes the zig zag section and is drivingly and coaxially connected to the drive tire by members 55. A motor 56 is mounted on the base 10, said motor having a drive sprocket 57 mounted on the motor shaft, which sprocket is drivingly connected to the other drive tire sprocket 54 by means of an endless drive chain 58. An annular chain guard 59 is also provided which is mounted on block 51' and which encloses the drive tire sprocket and the drive chain.

A discharge chute 60 is mounted on the base 10 by means of a supporting member 61, said chute completely enclosing the open discharge end of the discharge tube 22" which rotates freely within and relative to said chute. The back of the chute is closed by an annular seal ring plate 62 affixed to a seal ring collar 63 carried by tube 22". A pair of sealing rings 64 are secured to the plate 62 adjacent the outer edge theerof on opposite sides thereof and are maintained in sealing engagement with the chute by means of a pair of guide assemblies 65 carried by the chute.

In operation, the unagglomerated HPFF is continuously fed to the hopper 12, from whence it continuously passes directly into the moisturizing cylinder 17. A metered flow of liquid (such as water) is simultaneously fed to the dispersion head 24 through the drive shaft 25, said head centrifugally throwing and spraying fine droplets of water circumferentially thereof towards the peripheral wall of the moisturizing cylinder and about the entire circumference thereof.

Because the material coats or covers the inner wall of the moisturizing cylinder, no water reaches or makes contact with the wall of the chamber and thereby prevents fouling of said chamber and a build-up of sticky material thereon. As a result of the eccentric rotation of the moisturizing chamber, a continually renewing array of different particles are presented to the liquid fog. Thus, the solid and liquid constituents are uniformly blended together so that the liquid is uniformly distributed among and on the fine flour particles.

The material fed into the moisturizing cylinder gradually works its way from the feed side to the discharge side of said cylinder, and a set amount is then discharged therefrom into the first of the zig zag sections 22', and then gradually progresses longitudinally of the zig zag portion through successive tubes 22 until it ultimately emerges from the discharge tube 22'' in agglomerated form, the agglomerates issuing from tube 22'' being dumped into chute 60 from which they pass to the dryer D through discharge mouth 60*a* of said chute.

When the apex V of the joint between any two adjacent zig zag tubes is pointed upwardly, the material in said adjacent sections tends to fall away from said apex. When said apex is pointed downwardly, the material in said adjacent sections tends to move towards said apex. The movement of said apex from a downwardly pointing to an upwardly pointing position causes a portion of the material located in the area around said apex to move downstream towards the next V apex to progressively move the material through the zig zag section towards the discharge tube 22'' for ultimate discharge thereform. Thus, in progressing through the rotating agglomerator, the material is constantly recycled forward and backward at each V-junction during each revolution. With each revolution, a uniform quantity of material is discharged from the last leg 22''.

This repeated longitudinal reciprocating movement of the particles in each of the zig zag sections combined with the general radial or lateral movement therewithin occasioned by the continuous rotation, causes repeated agitation and shaking and thorough intermixing and repeated contact of the wetted particles which achieves the agglomeration desired. Thus, the wetted particles are subjected to a gentle tumbling action and rolling type movement over each other in which all of the particle movement including movement longitudinally of the tubes is effected by gravity forces. The individual particles and the agglomerates formed therefrom are not crushed, smeared or subjected to excessive mechanical working. Recycling of wet material takes place continuously with backward and forward traverses occurring at random, whereby virtually all of the wet particles are assured of being assembled into agglomerates before being discharged from the agglomerator, and thereby assuring a higher percentage yield of agglomerated product. The particles are shifted upstream and downstream, with the net flow being downstream, with the overall situation being one of flow equilibrium. At each leg, back and forth flow conditions are stabilized.

The discharge leg 22'' dumps its charge each revolution, and is the only leg of the zig-zag that handles a unidirectional flow. Every leg upstream therefrom has a downstream flow for a half revolution followed by an upstream flow during the other half revolution. The differences between upstream and downstream flows in all legs are equal. All these differences, under equilibrium conditions, equal the periodic discharge that occurs at the last leg of each revolution.

Flows and discharges in the series of legs are all different, even though the flow differences are equal. The legs carry progressively smaller charges as the material moves downstream.

Recycling of material occurs at each apex V during each revolution. A portion of the material held by that part goes downstream the rest goes upstream.

The multiple recycling steps afforded by this apparatus completely levels off any feeder flow variations. There are no screens, baffles, or impellers in the path of the wetted particles to damage said particles or the agglomerates formed therefrom.

The inlet end of the agglomerator is slightly higher than the discharge end thereof with the axis X being slightly downwardly inclined in the direction of flow (from left to right as viewed in FIGURE 2) to assure the continuous movement of the material through the agglomerator. The rate of flow of material through the agglomerator can be readily controlled by controlling the speed of rotation and the angle of tilt of the axis of rotation X. Thus, the time which the material spends in the agglomerator can be regulated within broad limits so as to achieve the amount of particle contact necessary for proper agglomeration. It will also be understood that the zig-zag section is of sufficient length that the wetted particles will be retained therewithin long enough to permit the desired degree of adhesiveness to develop on the particles and to further achieve the desired degree of intermixing of the particles necessary to achieve the agglomeration.

The agglomerates formed by the aforedescribed method on the apparatus disclosed and described are of substantially uniform size and have an average size of about 10 mesh, with 90% of the agglomerated material being between 10 and 50 mesh. If desired, the size of the agglomerates can be reduced by conventional roll mill grinding, e.g. 100% less than 30 mesh without destroying the desired characteristic of the agglomerated product. The agglomeration of the HPFF materially increases the bulk density thereof, the 10 mesh material having a bulk density which is between two and three times as large as that of the unagglomerated control material. Thus, for example, a typical control sample of unagglomerated HPFF had a loose bulk volume of 6.06 ft.³/cwt. (16.5#/ft.³) and a vibrated bulk volume of 5.0 ft.³/cwt. (20.0#/ft.³). The same material as agglomerated (10 mesh) had a loose bulk volume of 2.3 ft.³/cwt. (42.4#/ft.³) and a vibrated bulk volume of 2.11 ft.³/cwt. (47.4#/ft.³). The same agglomerated material ground to 30 mesh size had a loose bulk volume of 2.96 ft.³/cwt. (33.8#/ft.³) and a vibrated bulk volume of 2.59 ft.³/cwt. (38.6#/ft.³). Thus, the foregoing figures sharply illustrate the substantial decrease in bulk volume and the corresponding increase in bulk density resulting from the agglomeration of HPFF.

As an illustration of the improved flowability achieved by agglomeration, unagglomerated control HPFF and agglomerated HPFF ground to 30 mesh were tested on similar equipment which included discharge from a vibrating discharge spout or cone. The equipment used to measure the flowability comprised a funnel having a coarse screen at the spout with steel balls on the screen to furnish the agitation, the entire funnel being vibrated magnetically. This apparatus shows a great sensitivity to flow rate. It took five minutes to discharge 45 grams of unagglomerated HPFF. In contrast, the same amount of the agglomerated material was discharged in 40 seconds.

In another test, 3 samples (10 g., 30 g., 50 g.) each of the agglomerated and unagglomerated material were run through the test apparatus with the following results:

| | Sample Wt., grams | Sample Discharge Time |
|---|---|---|
| Unagglomerated | 10 | 4 min. 24.5 sec. |
| Agglomerated | 10 | 16.6 sec. |
| Unagglomerated | 30 | Flow cone plugged. |
| Agglomerated | 30 | 48.5 sec. |
| Unagglomerated | 50 | Flow cone plugged. |
| Agglomerated | 50 | 1 min. 19.6 sec. |

Baking tests utilizing unagglomerated and agglomerated HPFF indicated improved baking qualities for the agglomerated material. Bread baked from agglomerated HPFF has improved internal characteristics including better grain and texture than bread baked from unagglomerated HPFF.

In a typical successful operational run, HPFF having about 20% protein and a Fisher size of about 4.0, was agglomerated in apparatus similar to that illustrated. The agglomerator had 7 legs in the zig-zag section, said legs being 10 inches in diameter, with the five intermediate legs being 21 inches long, the end legs 22′ and 22″ being proportionately shorter. The moisturizing cylinder was 10½ inches long and 21½ inches in diameter. The axis of rotation was set at an angle of about 2°, and the speed of rotation of the zig-zag and moisturizing cylinder was 20 r.p.m. It took about 15–20 seconds for agglomerated material to begin being discharged. The material fed to the agglomerator contained 9% moisture. The water disperser was operated at 1600 r.p.m. The material was fed in at a rate of 25 pounds per minute, and water entered through the disperser at 5 pounds per minute resulting in the wet agglomerates having a moisture content of 24%. The agglomerates were dried to about 13% total moisture. The agglomerates formed had all the aforementioned physical characteristics and advantages.

The aforedescribed system can be successfully operated within the following ranges:

(a) HPFF feed-in of 15–31 pounds per minute;
(b) Water additions of 3–6 pounds per minute;
(c) Water disperser speed of 1400–3000 r.p.m.;
(d) Agglomerator (blender) speed of 16–30 r.p.m.
(e) 2–2½ degrees slope in the axis of rotation.

Thus, a desirable wetting rate is to add about one pound of water per minute to each five pounds of HPFF to be agglomerated, which gives the wet agglomerates a moisture content of 23% to 25%. If the moisture content is too great, coarse agglomerates or pills will form.

The particles comprising the HPFF agglomerates are self-bonded to each other by the wetted protein in the material, which protein becomes tacky and adhesive when enough moisture is added thereto. The same is true of any other type of flour containing product agglomerated according to this invention in which the major portion of the product consists of flour. Thus, the invention applies to the agglomeration of material containing only flour, and to the agglomeration of a mixture of flour and non-flour material in which the flour comprises the major portion of the mixture and the moisturized protein thereof serves as the primary bonding agent in the agglomerated product, and to any flour containing product in which adhesive surfaces can be formed on the particles comprising same by the addition of moisture thereto.

The Fisher values referred to herein were arrived at in accordance with the standardized method of conducting the Fisher Subsieve Size Test as described in the publication of B. Dubrow, "Analytical Chemistry," volume 25, 1953, pp. 1242 to 1244; "Fisher Scientific Co. (Pittsburgh, Pa.), Directions for Determination of Average Particle Diameters, etc."

Although water is a preferred liquid used to agglomerate HPFF, it will be understood that other liquids capable of forming adhesive surfaces on the particles can be used and come within the scope of this invention. It will be further understood that the apparatus illustrated and described is but one preferred means for carrying out the agglomeration of the material under consideration, and that the invention is not necessarily limited thereto, other apparatus capable of carrying out the method of this invention coming withing the scope hereof.

Flour material other than HPFF can be successfully agglomerated by the method and in the apparatus hereinbefore described, typical examples being plain conventional cereal flour, high protein fine fraction flour having a protein content higher than that of HPFF (and which also usually has a Fisher value not greater than 5.0), and vital wheat gluten. The later usually has about 80% protein (with the remainder being mostly starch), but the protein content may vary therefrom somewhat within the broad range of about 70–90%. A typical specific example of vital wheat gluten agglomerated according to this invention is as follows: vital wheat gluten containing 78% protein and 5½% moisture was fed to the agglomerator at a rate of 10 pounds per minute and was moisturized therein by water fed to the agglomerator at a rate of 2.2 pounds per minute, thereby increasing the moisture content of the gluten by 22% to a total moisture level of 22.5%.

Figure 8:
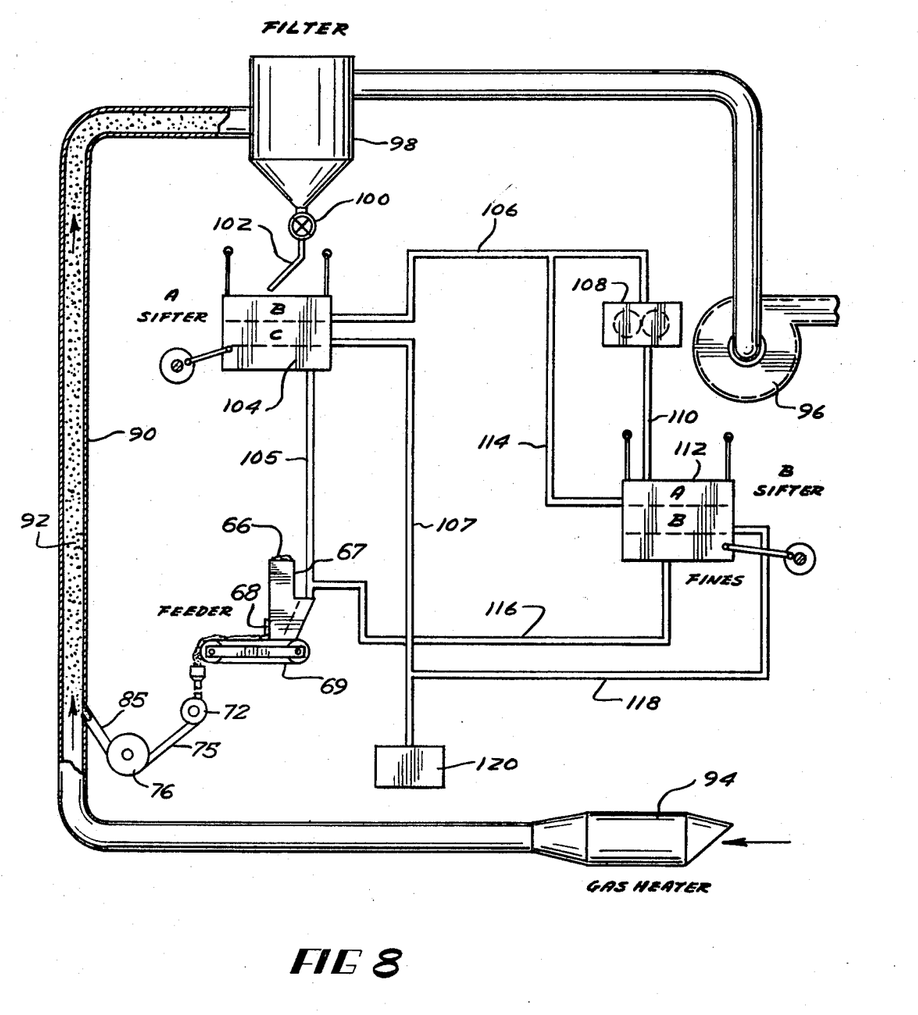
FIGURE 8 is a semi-diagrammatic illustration of another form of apparatus in accordance with the invention.
Figure 9:
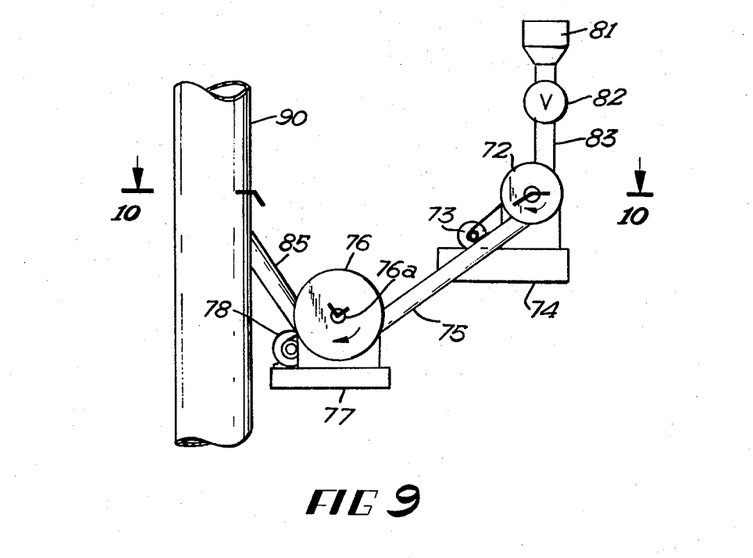
FIGURE 9 is a partial end elevational view of the two-stage mixer in accordance with a modified form of the invention.
Figure 10:
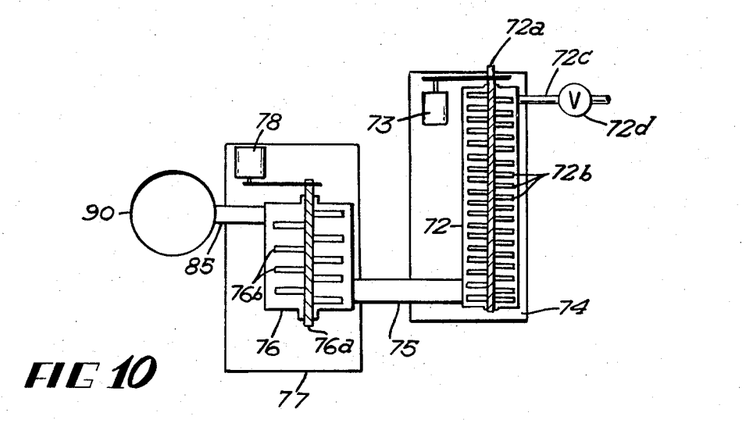
FIGURE 10 is a sectional view taken on line 9—9 of FIGURE 8.

Refer now particularly to FIGURES 8, 9 and 10 which illustrate another form of the invention. In accordance with this form of the invention the material to be agglomerated such as high protein flour 66 of the type described above is introduced into a hopper 67 having a vertically adjustable flow control gate at its lower end. The flour 66 passes beneath the gate 68 as a bed having uniform thickness on the upper surface of an endles belt conveyor 69 which is driven in the appropriate direction to advance the material toward the left as seen in FIGURE 8. The flour thus passes off the end of the conveyor, as seen in FIGURE 9, at a uniform and controlled rate into a hopper 81 through a shut-off valve 82, a duct 83 to a mixer 72 which consists of a horizontally disposed cylindrical casing having an axially extending and horizontally disposed rotatable mixer shaft 72a to which are secured longitudinally spaced radially extending blades 72b. Each of the blade is mounted at an angle of about 45° relative to the axis of shaft 72a. In a typical application, the mixer 72 is about 8 inches in diameter and about 30 inches long. The blades 72b are spaced about 1/16 inch from the inside surface of the casing. Moisture in the form of either water or steam is introduced into the casing through a line 72c and valve 72d. The moisture content of the flour is preferably brought to a level between about 31–32% by weight. If substantially less moisture is used, the agglomerates will be soft. If the moisture content is too great, coarse agglomerates or pills will form.

Rotaiton is imparted to the shaft 72a by a suitable driving means such as electric motor 73. The mixer 72 and motor 73 are supported upon a base 74. Material introduced to the mixer 72 is placed in highly turbulent random motion and is vigorously agitated by the blades 72b. The moisture introduced through line 72c is uniformly and thoroughly mixed with the dry particles introduced through duct 83. In accordance with the invention, the shaft 72a is rotated at a relatively rapid rate producing a speed at the periphery of the blades 72b of about 5000–8000 feet per minute. It has been discovered that this operating speed is highly effective in producing an intimate mixture of dry high protein particles and moisture. There is, moreover, little tendency for undesired deposits of moist particles to accumulate within the mixer 72. At this point in the process, the particles have not been exposed to moisture for a sufficient period of time to produce hydration to a degree necessary to cause the particles to adhere to one another. The moisture is, however, uniformly distributed over the surfaces of the particles. The pitched relationship of the blades on shaft 72a will cause the particles to be advanced toward an outlet duct 75.

Material carried through duct 75 passes into a second mixer 76 which also consists of a horizontally disposed cylinder having an axially extending mixer shaft 76a supported for rotation therein and driven at a reduced velocity relative to mixer 72 by the provision of a suitable drive means such as a motor 78. The mixer 76 and motor 78 are supported upon a suitable base 77. As in the case of shaft 72a, the mixer shaft 76a is provided with a plurality of radially extending longitudinally spaced pitched blades 76b which are oriented at an appropriate angle relative to the shaft 76a to advance the particulate materials therein toward the opposite end from the duct 75. The shaft 76a of the second mixer 76 is rotated at a much slower speed to produce a peripheral velocity on the order of from 1500–3000 feet per minute. This mixes the previously moistened flour over the relatively long period of time necessary to complete the thorough agglomeration of the high protein flour particles.

The particulate material after passing through mixer 76 is exhausted through duct 85 which communicates with a drying zone. The drying zone in this instance comprises a vertically disposed duct 90 through which a rising current of heated drying gas, e.g. hot air is passed. The temperature of the air within duct 90 can be from about 70° to 600° F. but preferably between 200°–400° F. The air passing through duct 90 is conveniently heated by a gas heater 94 propelled by the provision of a suitable blower or fan 96 which communicates with the top of the duct 90 through a collector 98 used for removing the dried agglomerates from the gas stream. The agglomerates in the collector 98 are removed through a rotary discharge valve 100. Dried agglomerates are allowed to flow from the valve 100 through duct 102 to a sifter of a suitable conventional known construction 104 and from the sifter the coarse particles pass through a duct 106 to a mill 108 such as a roll stand to reduce the particles to the desired size. The particles pass out of the roll stand through a duct 110 to a second sifter 112 similar to 104 which contains stacked screens with openings of graded sizes. In this instance, the coarse particles are returned through a line 114 to the mill 108, the fines are returned through a line 116 to the feed hopper 67. The finished product which consists of agglomerates of a desired size is conveyed through a duct 118 to a finished product storage container 120. The fines from the sifter 104 are conducted through a conduit 105 to the hopper 67. The finished product passing through the sifter 104 flows through a duct 107 to the product storage container 120.

The apparatus described in connection with FIGURES 8–10 is capable of operating for substantially longer periods of time without shutdown and without the formation of undesired deposits of material than that described in FIGURES 1–7. Moreover, the finished agglomerates have greater strength and flow properties are better during pneumatic transport and bulk handling than in the case of material formed in connection with the apparatus in FIGURES 1–7 due to a reduction in the breakdown of agglomerates during shipment. The two-stage mixing in accordance with this form of the invention combines the dependability of a high-speed mixer 72 in producing uniform distribution of the moisture with the relatively long retention time of the mixer 76 required for successful agglomeration of high protein flours of the type involved. The agglomerates produced are less subject to physical breakdown than these produced in the apparatus of FIGURES 1–7. Both the initial flow properties as well as the flow properties after bulk handling are greatly improved. Standard Faringograph tests indicate a substantially improved rate of hydration for this product as compared with either unagglomerated high protein flour or the flour agglomerated in the apparatus of FIGURES 1–7. Bake tests indicate that it performs equal to the flour agglomerated as in FIGURES 1–7 and slightly better than unagglomerated flour. The invention will be better understood by reference to the following examples.

EXAMPLE I

A high protein flour (20% protein) having a Fisher value of about 4 was agglomerated in an apparatus similar to that described in FIGURES 8–10. The mixer 72 had a diameter of 8 inches and a length of 30 inches. The mixer 76 had a diameter of 10 inches and a length of 14 inches. The speed of the periphery of blades 72b was 6250 feet per minute (2990 r.p.m.). The mixer 76 was operated to provide a peripheral speed of 1730 feet per minute at the periphery of blades 76b (660 r.p.m.). High protein flour of the type described was fed to the duct 90 at the rate of 10 pounds per minute. Water was introduced through line 72c at the rate of 3.15 pounds per minute. Air was introduced in duct 90 at the rate of 2775 c.f.m. The temperature of the air in duct 90 was 292° F. before the introduction of the product through duct 85. The moisture content of the finished product was 16.8% by weight. The flowability of the product as determined in col. 9, line 73 was 5.75 seconds. The finished agglomerates in size ranged between about 110 microns and 947 microns.

EXAMPLE II

Agglomeration was carried out as in Example I except that the 8-inch mixer was operated at 5000 f.p.m. The air duct 90 was at a temperature of 325° F. The agglomerates were similar to those described in Example I except that the moisture content was 14.8% by weight. Flowability was 8.95 seconds.

EXAMPLE III

Another run was conducted with the same conditions as in Example I except that the 8 inch mixer was operated at 7500 f.p.m. The finished product was the same as that described except that the flowability was 5.1 seconds. Before being agglomated, the flour had a flowabilty rate of 68.4 seconds. Bake results were equal or better than those of the flour in all of the Examples I–III.

It is apparent that many modifications and variations of this invention as hereinbefore set forth may be made

I claim:

1. A process for agglomerating a high-protein cereal grain flour fraction containing at least 18% protein and having a Fisher value of about 4.0, said process comprising introducing moisture to the flour to increase the moisture content at least 10% by weight, briefly and thoroughly mixing the flour and water by subjecting the flour and water to agitation to bring the wetted particles into random contact with each other within a first mixing zone, immediately transferring the flour in the first zone directly to at least one subsequent mixing zone, subjecting the flour that has been moistened in the first mixing zone to continued agitation in at least one of the subsequent mixing zones for an additional period of time such that the total mixing time is sufficient to permit bonding together of the flour particles and thereafter drying the agglomerates thus formed to rigidify the bonds between adjacent particles.

2. The process according to claim 1 wherein the particles are dried by transferring the particles from the subsequent mixing zone into a relatively dry gaseous drying medium.

3. The process according to claim 1 wherein the drying medium comprises heated air.

4. The process according to claim 3 wherein the heated air comprises a stream of heated air and said agglomerates are suspended in the stream of air carried with the air stream.

5. The process according to claim 1 wherein the moisture content of the flour particles is increased to a value above about 30% by weight.

6. The process according to claim 1 wherein the agglomerates are dried by suspending them in an air stream maintained at a temperature between about 70°–600° F.

7. The process according to claim 1 wherein the moisture content of the flour particles is initially raised to a value of at least about 30% by weight, the particles are intensely agitated in the first mixing zone for a relatively brief period of time to distribute the moisture among the particles and holding the second mixing zone for a relatively longer period of time to allow hydration of the previously wetted particles sufficient to promote bonding between the particles, said particles being thereafter transferred into a rising column of heated air for drying the particles to rigidify the bonds therebetween.

8. The process according to claim 1 wherein said mixing zones comprise adjacent obliquely related sections of a cylinder having a zigzag shape, said cylinder being rotated about an eccentric axis positioned in a horizontal plane to shift the particles from one zone to another as the cylinder rotates.

9. The process according to claim 1 wherein highly turbulent mixing conditions are provided in each of the mixing zones to create an intensely agitated condition, the particles being thereby present as a suspension in a mixture of gas and moisture within the mixing zone, said particles being thereafter transferred from the second mixing zone to a drying zone.

10. The product prepared in accordance with the process set forth in claim 1.

References Cited

UNITED STATES PATENTS

| | | | |
|---|---|---|---|
| 2,900,256 | 8/1959 | Scott | 99—56 |
| 2,921,857 | 1/1960 | Sharp et al. | 99—56 |
| 3,248,228 | 4/1966 | Gidlow et al. | 99—93 |
| 3,221,338 | 11/1965 | Segal | 99—93 |
| 3,279,924 | 10/1966 | Peebles | 99—93 |

FOREIGN PATENTS 236,311  11/1961  Australia.

MAURICE W. GREENSTEIN, *Primary Examiner.*